United States Patent
Ueno et al.

(10) Patent No.: US 11,973,388 B2
(45) Date of Patent: Apr. 30, 2024

(54) ROTATING ELECTRIC MACHINE, INSULATOR, AND ASSEMBLY METHOD THEREFOR

(71) Applicants: KYB CORPORATION, Tokyo (JP); TOP CO., LTD., Echizen (JP)

(72) Inventors: Sayaka Ueno, Tokyo (JP); Hiroyuki Miyoshi, Echizen (JP); Tohru Takimoto, Echizen (JP)

(73) Assignees: KYB Corporation, Tokyo (JP); TOP Co., Ltd., Echizen (JP)

( * ) Notice: Subject to any disclaimer, the term of this patent is extended or adjusted under 35 U.S.C. 154(b) by 594 days.

(21) Appl. No.: 17/264,392

(22) PCT Filed: May 8, 2019

(86) PCT No.: PCT/JP2019/018344
§ 371 (c)(1),
(2) Date: Jan. 29, 2021

(87) PCT Pub. No.: WO2020/035976
PCT Pub. Date: Feb. 20, 2020

(65) Prior Publication Data
US 2021/0296957 A1    Sep. 23, 2021

(30) Foreign Application Priority Data

Aug. 17, 2018   (JP) ................. 2018-153379

(51) Int. Cl.
*H02K 3/34*       (2006.01)
*H02K 1/14*       (2006.01)
*H02K 15/10*      (2006.01)

(52) U.S. Cl.
CPC ............. *H02K 3/345* (2013.01); *H02K 1/146* (2013.01); *H02K 15/10* (2013.01); *H02K 2203/12* (2013.01); *H02K 2213/03* (2013.01)

(58) Field of Classification Search
CPC ............ H02K 3/30; H02K 3/325; H02K 3/34; H02K 3/345; H02K 2203/12; H02K 3/32–40
USPC ................................................ 310/216.105
See application file for complete search history.

(56) References Cited

FOREIGN PATENT DOCUMENTS

| JP | 3629193 B2 | 3/2005 |
| JP | 2007252030 A | * 9/2007 |
| JP | 2009106113 A | * 5/2009 |
| JP | 2014-138429 A | 7/2014 |

(Continued)

OTHER PUBLICATIONS

Machine translation of JP-2009106113-A (Year: 2009).*

(Continued)

*Primary Examiner* — Daniel C Puentes
*Assistant Examiner* — Minki Chang
(74) *Attorney, Agent, or Firm* — SALIWANCHIK, LLOYD & EISENSCHENK

(57) ABSTRACT

A rotating electric machine according to an embodiment of the present invention includes a rotor; a stator; an insulator; and a coil. The rotor rotates about a first axis. The stator includes teeth projecting toward the rotor. The insulator is attached to each of the teeth. The coil is wound around the insulator. The insulator includes a pair of side surface portions that are mounted on the teeth to generate a biasing force against the teeth in a twisting direction with respect to a direction of the first axis.

6 Claims, 13 Drawing Sheets

(56) References Cited

FOREIGN PATENT DOCUMENTS

JP        2015-122896 A    7/2015
JP        2017-93081 A    5/2017

OTHER PUBLICATIONS

Machine translation of JP-2007252030-A (Year: 2007).*
International Search Report dated Jul. 23, 2019 in International Application No. PCT/JP2019/018344.
Office Action dated Jul. 1, 2022 in Japanese Application No. 2018-153379.

* cited by examiner

ROTATING ELECTRIC MACHINE, INSULATOR, AND ASSEMBLY METHOD THEREFOR

CROSS-REFERENCE TO RELATED APPLICATIONS

This application is the U.S. national stage application of International Patent Application No. PCT/JP2019/018344, filed May 8, 2019, which claims the benefit under 35 U.S.C. § 119 of Japanese Application No. 2018-153379, filed Aug. 17, 2018, the disclosures of each of which are incorporated herein by reference in their entirety.

TECHNICAL FIELD

The present invention relates to a rotating electric machine, an insulator, and an assembly method therefor.

BACKGROUND ART

Insulators are inserted into teeth to insulate between the teeth and coils to be wound around the teeth, the teeth being a stator core of a rotating electric machine and being annularly disposed.

Structures for inhibiting this type of insulator from falling off the respective teeth before coil winding are disclosed.

For example, Patent Literature 1 discloses a structure for narrowing the opening width of the insertion start end of the insulator to a width smaller than the acceptance width of the teeth. Patent Literature 2 discloses a structure in which a protrusion is provided on the inner surface of the insulator and the protrusion is fitted to the teeth.

CITATION LIST

Patent Literature

Patent Literature 1: Japanese Patent No. 3629193
Patent Literature 2: Japanese Patent Application Laid-open No. 2014-138429

DISCLOSURE OF INVENTION

Technical Problem

In the above-mentioned fall-off prevention structure, it is difficult to insert insulators into teeth or the structures of the insulator and teeth become complicated, resulting in increased manufacturing costs.

In view of the circumstances as described above, it is an object of the present invention to provide an electronic apparatus, an insulator, and an assembly method therefor that are capable of achieving the function of insulators from falling off with a simpler configuration while ensuring the assemblability of insulators to teeth.

Solution to Problem

In order to achieve the above-mentioned object, a rotating electric machine according to an embodiment of the present invention includes: a rotor; a stator; insulators; and a coil.

The rotor rotates about a first axis.

The stator includes teeth projecting toward the rotor.

The insulators are attached to the teeth.

The coil is wound around each of the insulators.

Each of the insulators includes a pair of side surface portions that are mounted on the corresponding tooth to generate a biasing force against the tooth in a twisting direction with respect to a direction of the first axis.

In the rotating electric machine, since each of the insulators includes a pair of side surface portions that generate a biasing force against the corresponding tooth in a twisting direction with respect to a direction of the first axis, it is possible to achieve the fall-off inhibiting function with a simpler configuration while securing the assemblability to teeth.

Each of the teeth portions may include a peripheral wall portion and a projecting portion, the peripheral wall portion constituting an outer peripheral surface of the stator, the projecting portion projecting from the peripheral wall portion toward the rotor. Each of the insulators includes an opening portion housing the projecting portion, and the pair of side surface portions are disposed to face each other in a direction of a second axis perpendicular to the first axis with the opening portion therebetween.

The pair of side surface portions may be configured to generate the biasing force about the first axis against the projecting portion.

The pair of side surface portions may be configured to generate the biasing force about a third axis perpendicular to the first axis and the second axis against the projecting portion.

Each of the insulators may further include a cover portion that engages with the peripheral wall portion and supports the pair of side surface portions. The pair of side surface portions are configured to be elastically deformable relative to the cover portion.

A pair of side surface portions may be formed so that at least one of the following relationships:

$A2 <$ teeth width $w/2 < A1$;

$B1 <$ teeth width $w/2 < B2$;

$C2 <$ teeth width $w/2 < C1$; and $D1 <$ teeth width $w/2 < D2$ is satisfied, the teeth width w being a width of each of the teeth corresponding to a distance between two parallel side surfaces of the tooth that are in contact with the pair of side surface portions of the corresponding insulator, A and B being widths of both end portions of the opening portion before being assembled to the teeth in the direction of the first axis, C and D being widths of the both end portions of the opening portion before being assembled to the teeth in a direction of a third axis perpendicular to the first axis and the second axis, A1, A2, B1, B2, C1, C2, D1, and D2 being respectively obtained by dividing A, B, C, and D into two by projecting a central surface between the two parallel side surfaces of the tooth on the opening portion while causing the insulators to face the teeth for insertion.

An insulator according to an embodiment of the present invention is an insulator to be inserted into respective teeth of a motor stator core that includes a rotor rotating about one axis, the insulator including:

a pair of side surface portions that generate a biasing force against the teeth in a twisting direction with respect to a direction of the one axis.

An assembly method for an insulator according to an embodiment of the present invention is a method of assembling insulators to teeth of a motor stator core that includes a rotor rotating about one axis, including:

preparing an insulator, the insulator including a pair of side surface portions that generate a biasing force against the teeth in a twisting direction with respect to a direction of the one axis; and inserting the insulator into the respective teeth along the twisting direction.

MODE(S) FOR CARRYING OUT THE INVENTION

Hereinafter, an embodiment of the present invention will be described with reference to the drawings.

<Configuration of Electronic Apparatus>

Figure 1:
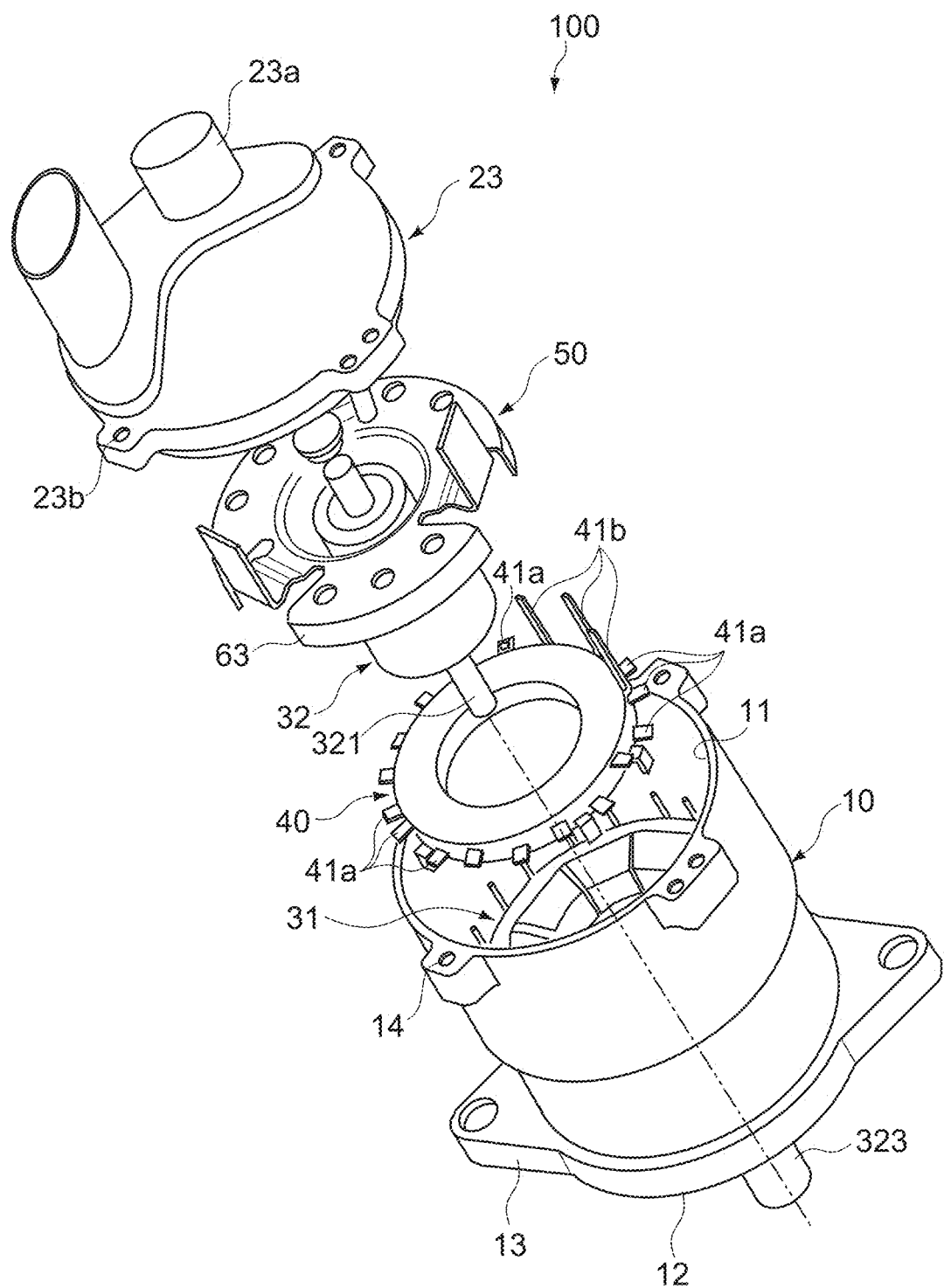
FIG. 1 is an exploded perspective view showing a configuration example of a rotating electric machine serving as an electronic apparatus according to an embodiment of the present invention.
Figure 2:
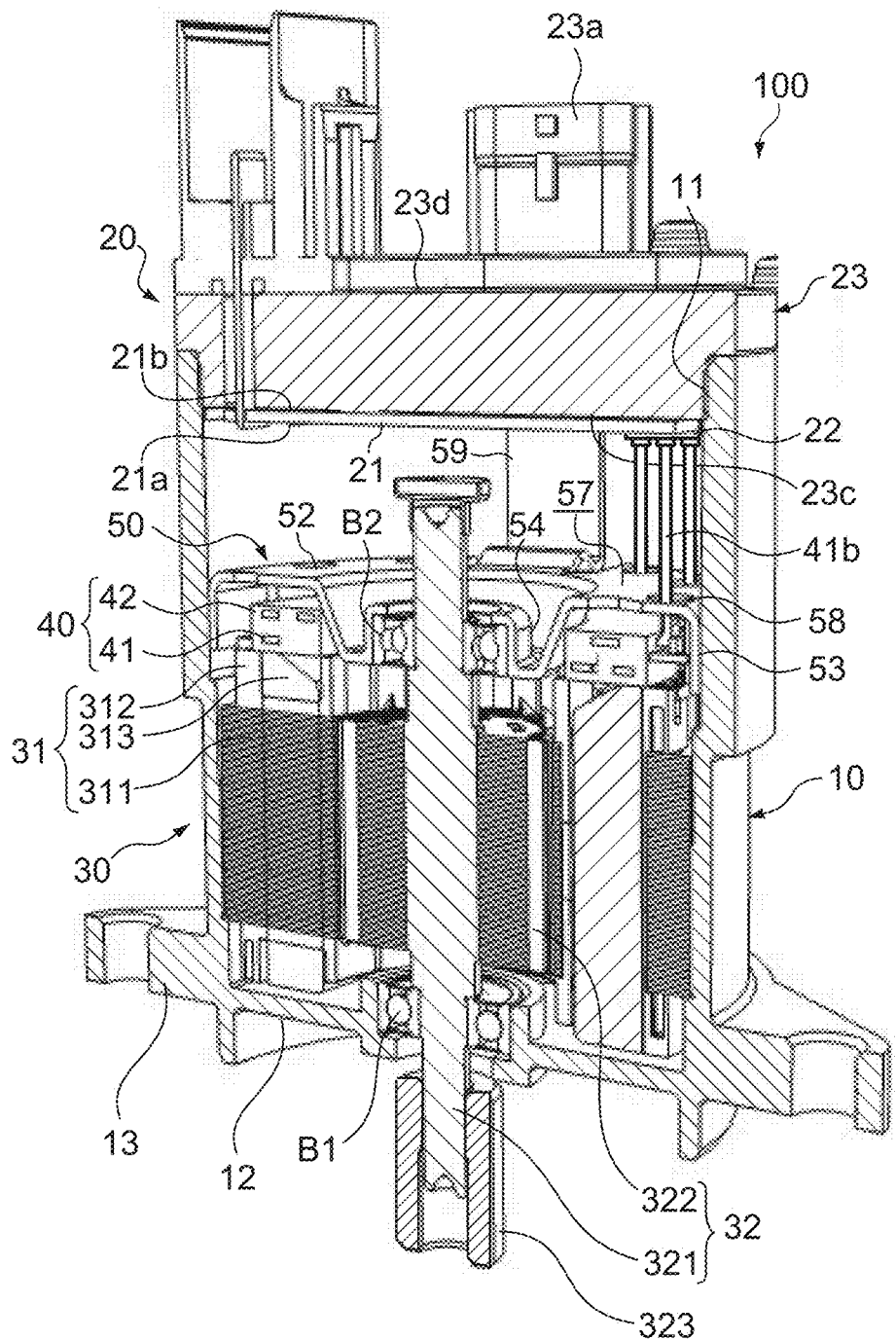
FIG. 2 is a cross-sectional perspective view of a main part of the rotating electric machine.

FIG. 1 is an exploded perspective view showing a configuration example of a rotating electric machine 100 according to an embodiment of the present invention, and FIG. 2 is a cross-sectional perspective view of a main part of the rotating electric machine 100.

The rotating electric machine 100 includes a casing 10, a component mounting body 20, a motor 30, a bus bar unit 40, and a holding member 50.

[Casing]

The casing 10 is formed in a schematic cylindrical shape having an opening 11 and a bottom portion 12 facing the opening 11. The casing 10 is formed of a metallic material such as aluminum, and houses the motor 30, the bus bar unit 40, and the like as shown in FIG. 2.

[Component Mounting Body]

As shown in FIG. 2, the component mounting body 20 is held in an upper end portion of the casing 10 above the motor 30, the bus bar unit 40, and the holding member 50. The component mounting body 20 includes a component mounting substrate 21, a connector component 22, and a heat sink 23.

As shown in FIG. 2, the component mounting substrate 21 has a first surface 21a and a second surface 21b opposed to the first surface 21a. The component mounting substrate 21 according to this embodiment is a circuit substrate that includes various electronic devices (not shown) constituting an ECU (Electronic Control Unit) of an electronic power steering (EPS) apparatus. The electronic device includes a CPU (Central Processing Unit), a memory, and the like. The component mounting substrate 21 is fixed to the heat sink (cover portion) 23 via a plurality of screw portions (not shown).

The heat sink 23 faces the second surface 21b of the component mounting substrate 21 and is assembled to the opening 11 of the casing 10 via a seal ring to constitute a cover portion that seals the inside of the casing 10. As shown in FIG. 1, a plurality of brackets 23b including a screw insertion hole is provided on the peripheral edge portion of the heat sink 23, and is screw-fixed to a plurality of fixed brackets 14 provided on the peripheral edge portion of the opening 11 of the casing 10 via the brackets 23b.

The heat sink 23 may be provided with a breathing hole capable of communicating the inside of the casing 10 with the outside air. As shown in FIG. 2, the heat sink 23 has an outer surface 23d provided with an external connection terminal 23a electrically connected to an external power source (not shown) and an inner surface 23c that faces the second surface 21b of the component mounting substrate 21 electrically connected to the bus bar unit 40.

[Bus Bar Unit]

The bus bar unit 40 includes a plurality of bus bars 41 formed of a conductive material and an electrically insulating bus bar holder 42 holding the bus bars 41 therein (see FIG. 2). The bus bar holder 42 is formed of annular molded body. The plurality of bus bars 41 includes a plurality of connection terminals 41a projecting outward from the outer peripheral surface of the bus bar holder 42 and a plurality of power supply terminals 41b that extends in a one-axis direction from the top surface of the bus bar holder 42 and corresponds to the U phase, V phase, and W phase (see FIG. 1).

The bus bar unit 40 is disposed inside the casing 10, has an annular shape concentric with a drive shaft 321, and is connected to a stator coil 313 described below. The plurality of connection terminals 41a is electrically connected to one end of the U-phase, V-phase, and W-phase stator coils 313, and the plurality of power supply terminals 41b is electrically connected to the connector component 22 on the component mounting substrate 21 fixed to the heat sink 23.

[Holding Member]

The holding member 50 is for positioning and holding a bearing B2 in the casing 10, and is formed of a press molded body of a metallic plate. In this embodiment, the holding member 50 obtained by deep drawing and bending a metallic plate into a three-dimensional shape is used.

[Motor]

As shown in FIG. 2, the motor 30 is housed in the casing 10 and includes a stator 31 and a rotor 32. The stator 31 includes a plurality of (e.g., twelve) teeth (stator core) 311 annularly disposed inside the casing 10, and insulator pairs 312, 312 that are inserted into and attached to the plurality of teeth 311 (see FIG. 13). The insulator 312 will be described below in detail. Here, the plurality of teeth 311 and the insulator pairs 312, 312 may each be a single one (one tooth 311 and one insulator 312).

The stator 31 further includes coils (stator coils) 313 wound around the plurality of insulator pairs 312, 312. The teeth 311 are each formed of a magnetic material and includes, for example, a laminate of a plurality of magnetic steel sheets.

The teeth 311 is fixed to the casing 10 by being fitted to the inner periphery of the casing 10. Both ends 313E (see FIG. 15) of the coil 313 are electrically connected to the bus bar unit 40 so as to form a three-phase electromagnetic coil of the U phase, the V phase, and the W phase.

Each of the teeth 311 is in the form of, but not limited to, a T-shaped column (see FIG. 13), and includes a peripheral wall portion 311A that constitutes an outer peripheral surface of the stator core 31 and a projecting portion 311B that constitutes an inner peripheral surface of the stator core 31. The projecting portion 311B projects from the peripheral wall portion 311A in the radial direction (X-axis direction) of the stator core 31 and is provided with a widening portion 311Bt having an expanded width dimension at the distal end thereof. Each of the teeth 311 has a T-shaped upper surface 311T, a T-shaped lower surface 311B, and a plurality of side surfaces. Each of the teeth 311 has, as side surfaces, two parallel side surfaces 311S, 311S located at both ends of the projecting portion 311B in the width direction, particularly.

The rotor 32 includes the drive shaft 321 that is parallel to a one-axis direction (Z-axis) and a rotor core 322 that is attached to the drive shaft 321. The drive shaft 321 is disposed along the axial center of the casing 10 and is press-fit into a through hole formed in the center of the rotor core 322. The drive shaft 321 is rotatably supported on the casing 10 via a bearing B1 (first bearing) disposed on the bottom portion 12 of the casing 10 and the bearing B2 (second bearing) held on the holding member 50. The rotor core 322 includes a plurality of magnetic poles arranged in the circumferential direction. The rotor 32 is disposed inside the stator 31 and electromagnetically acts with the stator 31 to cause the drive shaft 321 to rotate about its axis.

One end of the drive shaft 321 (the lower end in FIG. 1 and FIG. 2) penetrates through the bottom portion 12 of the casing 10 and includes a gear portion 323 at the distal end thereof. The gear portion 323 engages with a mating gear (not shown) communicating with a steering shaft and transmits rotation of the drive shaft 321 to the above-mentioned steering shaft. The bottom portion 12 of the casing 10 includes a flange portion 13 connected to a counter-side device and is connected to the device via a plurality of bolts.

[Insulator]

Figure 13:
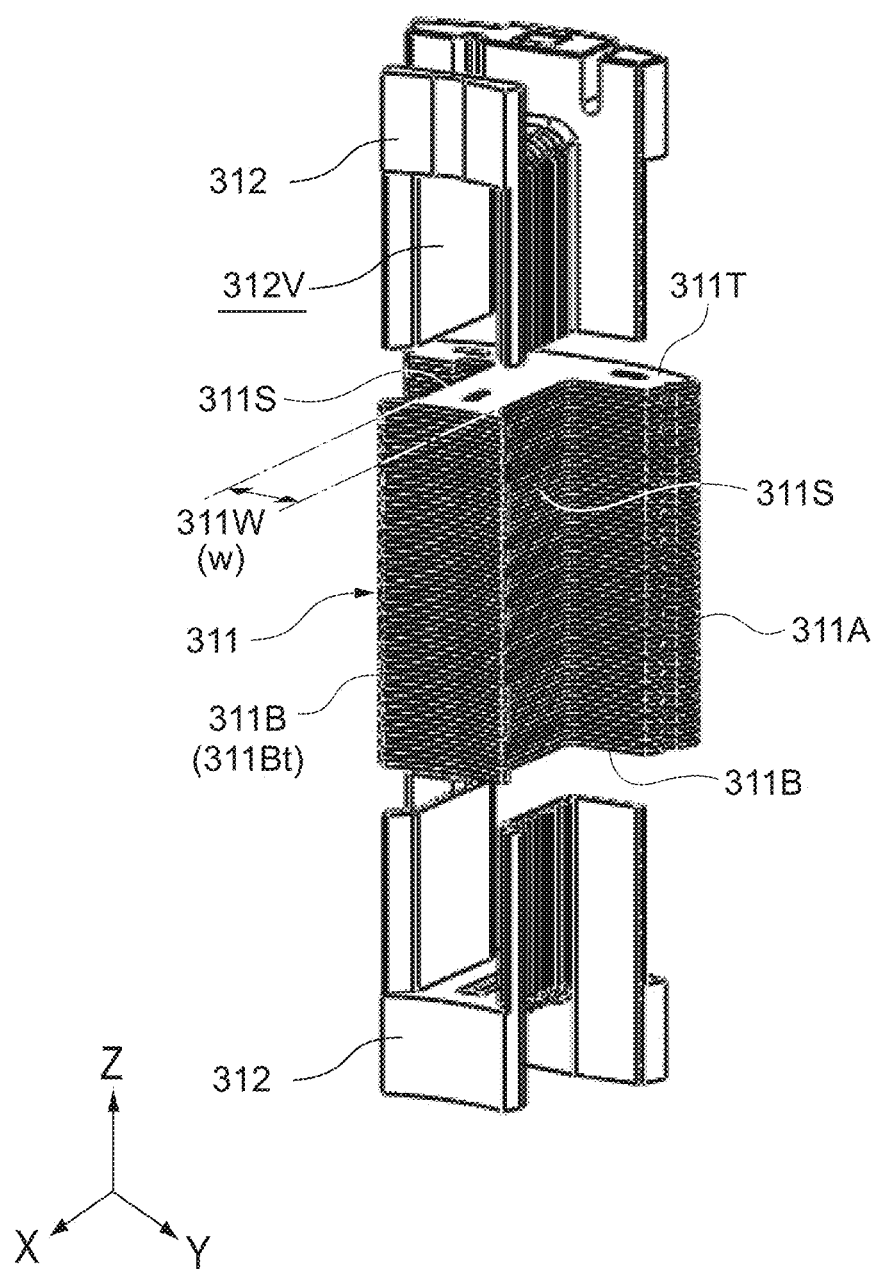
FIG. 13 is a perspective view showing a state before an insulator pair is attached to the teeth.

The insulator pair 312, 312 have the same or substantially the same configuration, and are mounted on the teeth 311 so as to face each other in the Z-axis direction (see FIG. 13).

Figure 3:
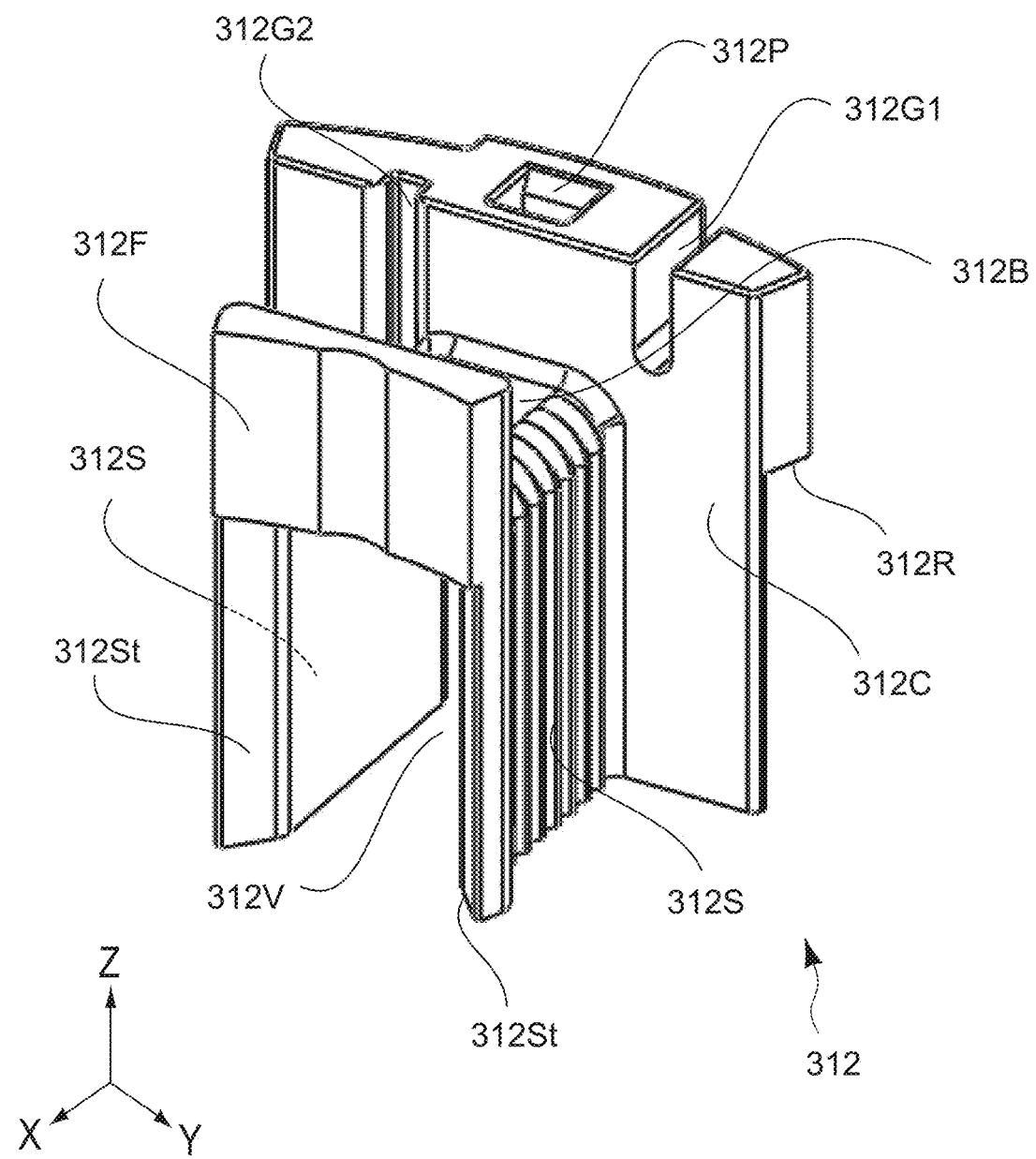
FIG. 3 is a perspective view showing an insulator alone according to an embodiment of the present invention.
Figure 4:
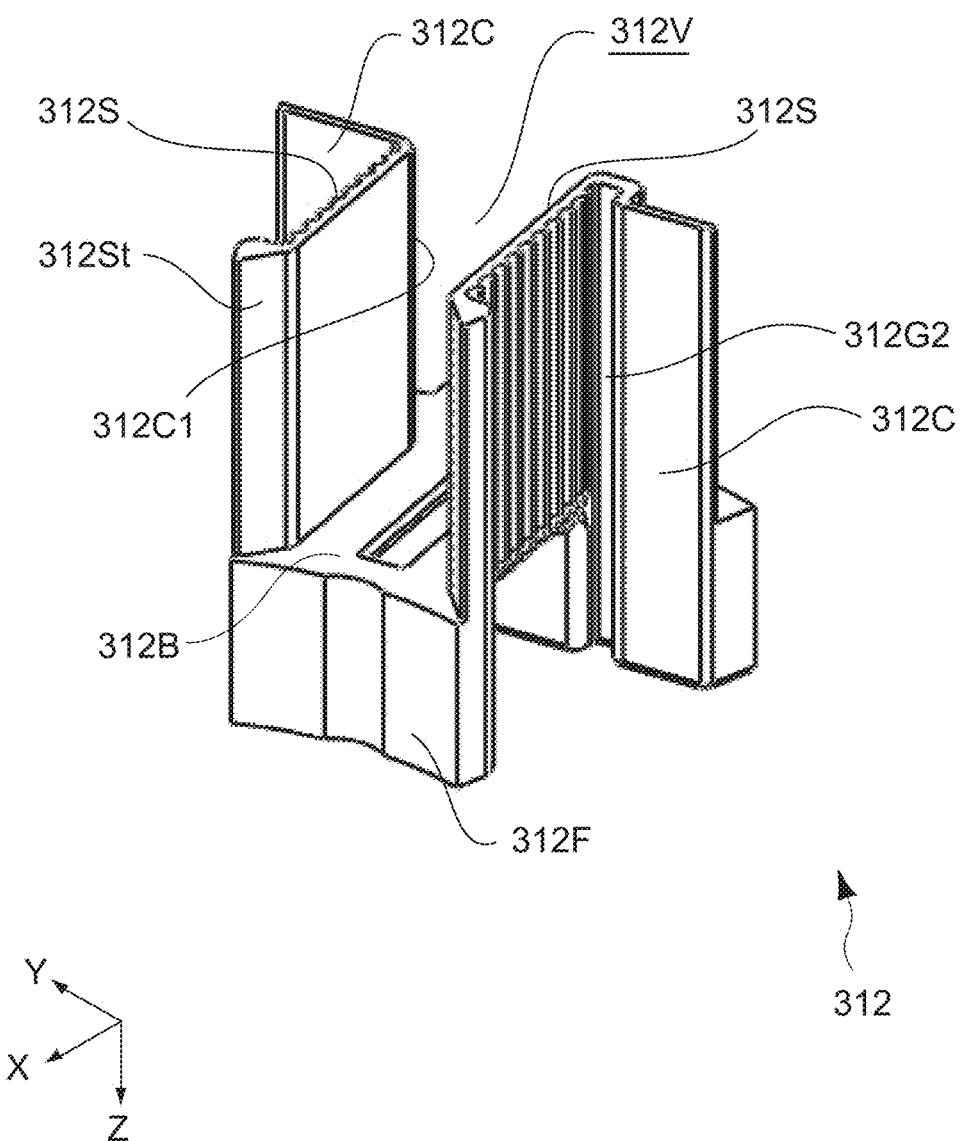
FIG. 4 is a perspective view when the insulator shown in FIG. 3 is inverted about an X-axis.
Figure 5:
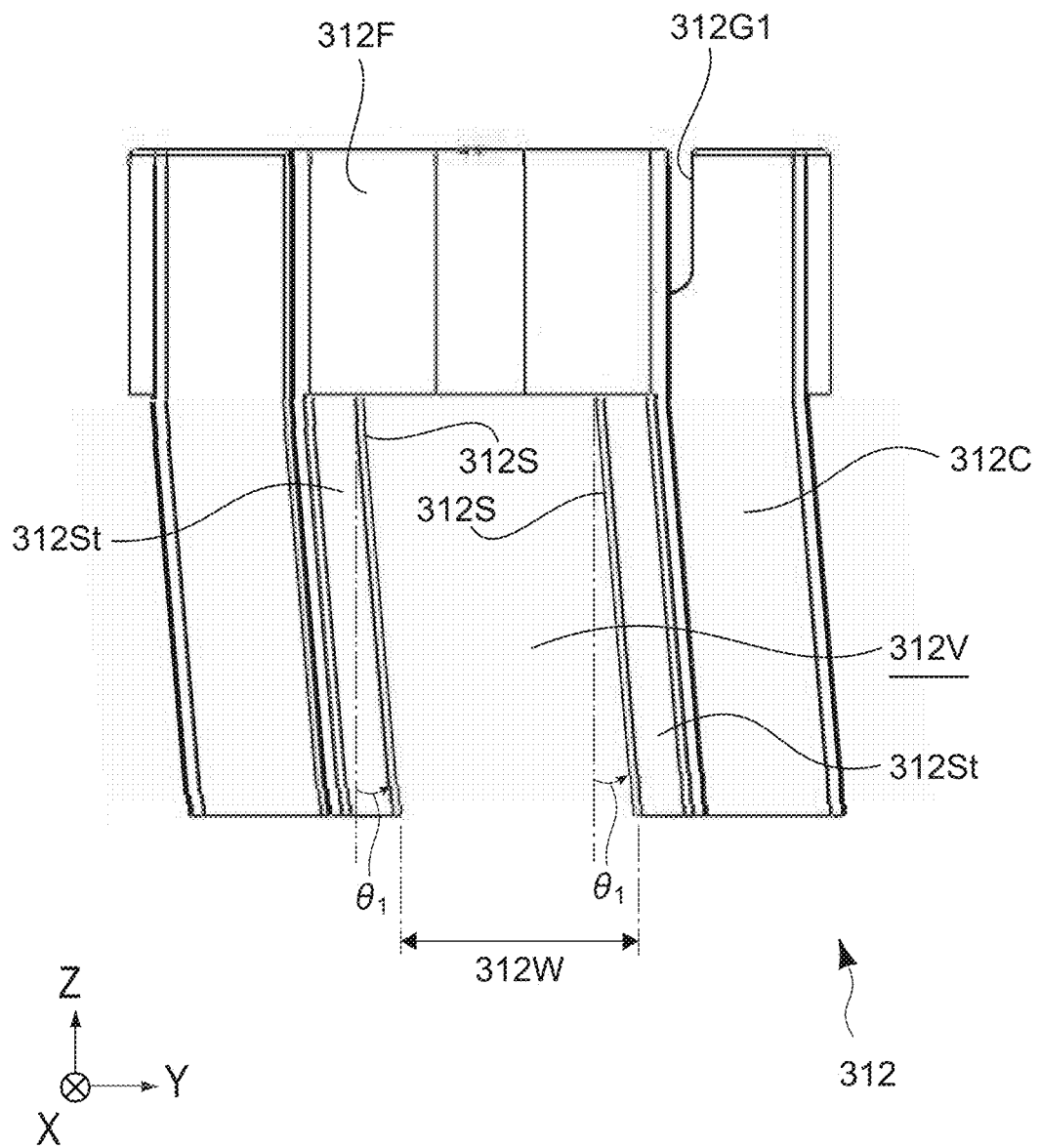
FIG. 5 is a front view of the insulator as viewed from the X-axis direction in FIG. 3.
Figure 6:
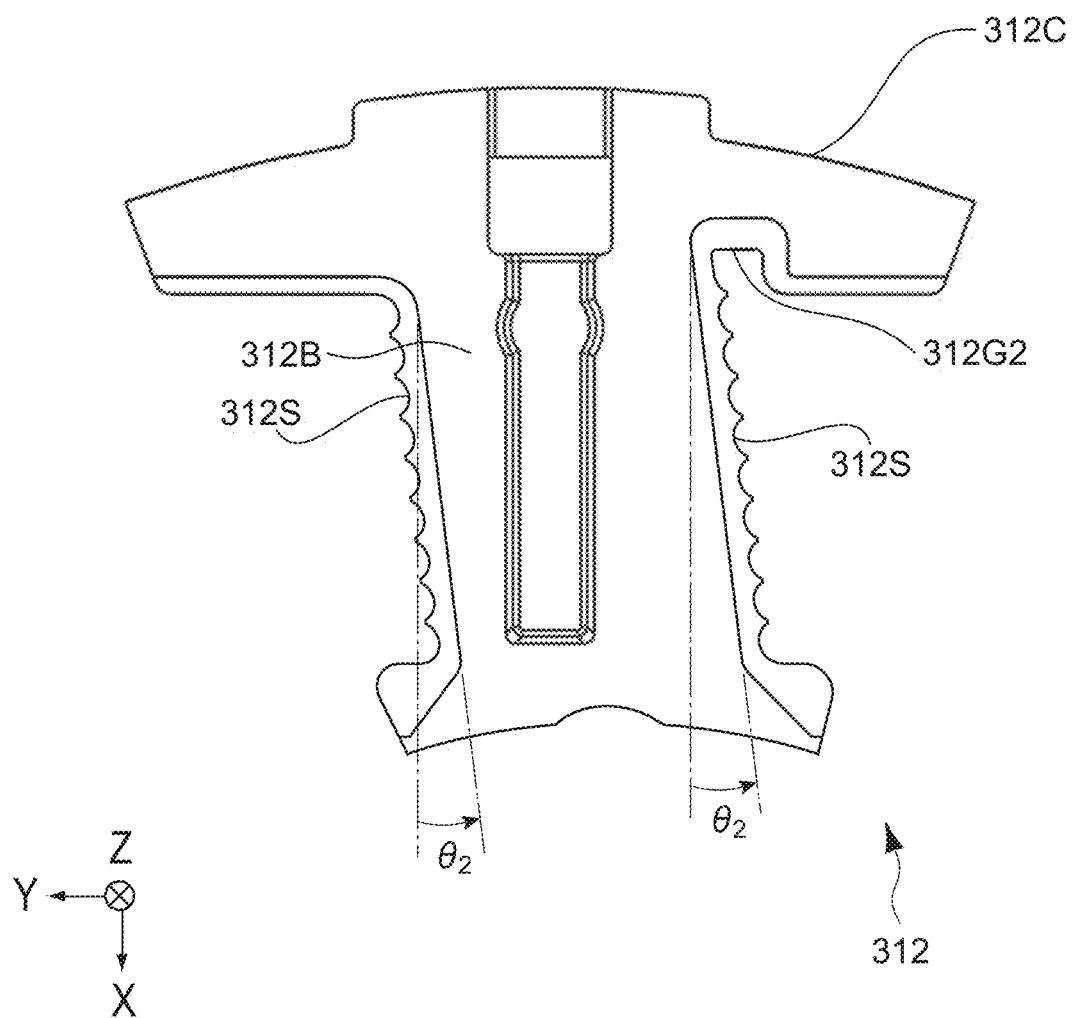
FIG. 6 is a plan view of the insulator as viewed from a Z-axis direction in FIG. 4.

FIG. 3 is a perspective view of one insulator 312 mounted on the upper surface 311T side of the teeth 311 as viewed from the inner diameter side. FIG. 4 is a perspective view when the insulator 312 shown in FIG. 3 is inverted about the X-axis. FIG. 5 is a front view of the insulator 312 as viewed from the X-axis direction in FIG. 3. FIG. 6 is a plan view of the insulator 312 as viewed from the Z-axis direction in FIG. 4.

In the drawings, the X-axis corresponds to the radial direction of the stator core 31, the Y-axis corresponds to the width direction of the insulator 312, and the Z-axis corresponds to the height direction of the insulator 312 (axial direction of the drive shaft 321).

The insulators 312 are formed so that they can be inserted (or extrapolated) into the T-shaped columnar teeth 311. The insulators 312 each include an injection molded body formed of an electrically insulating synthetic resin material, and each include a cover portion 312C, a flange portion 312F, a base portion 312B, and a pair of side surface portions 312S, 312S as shown in FIGS. 3 to 6.

The cover portion 312C and the flange portion 312F are formed so as to face each other in the radial direction (X-axis direction in the drawings) of the stator core 31. The cover portion 312C has a shape capable of engaging with the peripheral wall portion 311A of the teeth 311.

The base portion 312B is provided between the cover portion 312C and the flange portion 312F and covers the upper surface (or lower surface) of the projecting portion 311B of the teeth 311.

The pair of side surface portions 312S, 312S are each a plate-like portion that depends from both ends of the width direction (Y-axis direction) of the base portion 312B to the Z-axis direction (see FIG. 3), and cover the two side surfaces 311S, 311S of the teeth 311 (projecting portion 311B). The outer diameter edges of the pair of side surface portions 312S, 312S are supported by the cover portion 312C. The inner diameter edges of the pair of side surface portions 312S, 312S are each provided with a tapered portion 312St that is widened to engage with the widening portion 311Bt in the projecting portion 311B of the teeth 311.

Hereinafter, details of the respective portions will be described.

Figure 14:
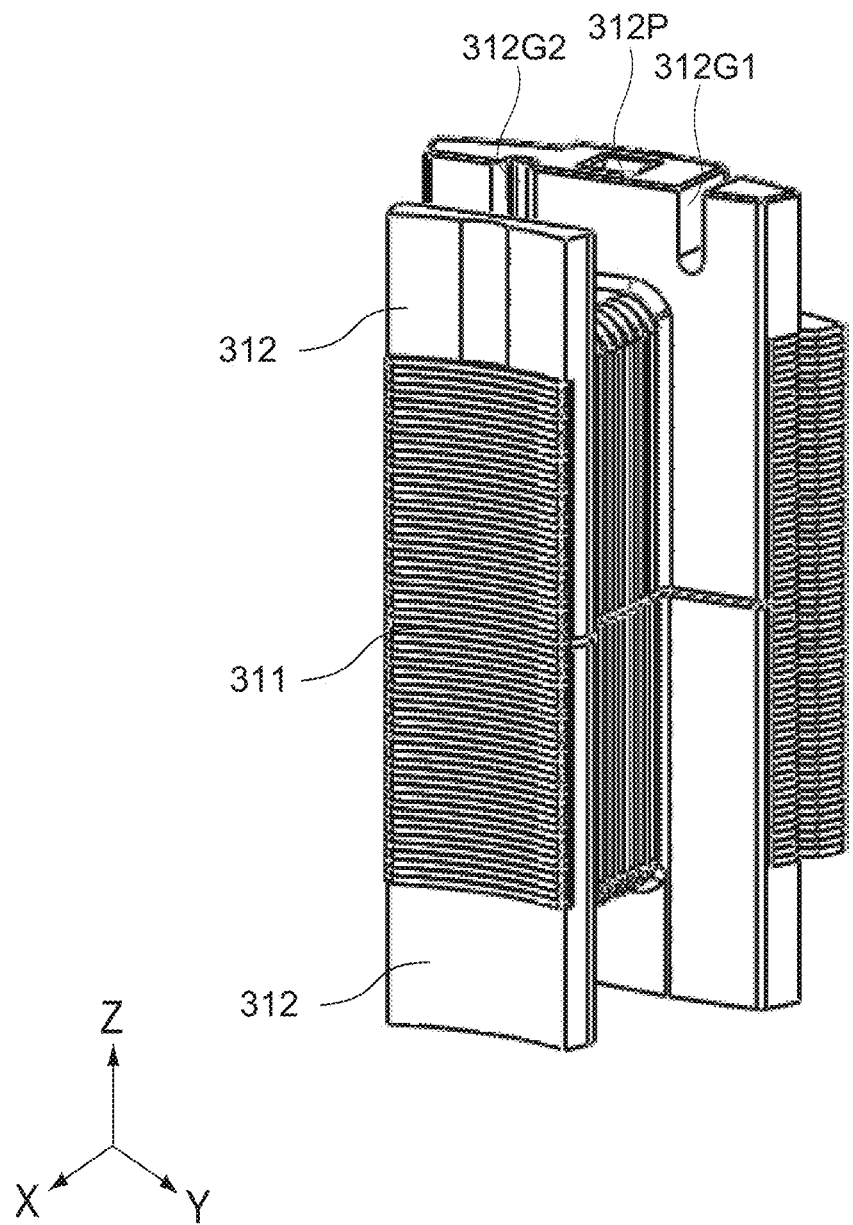
FIG. 14 is a perspective view showing a state in which the insulator pair is inserted into one tooth.

The cover portion 312C covers the peripheral wall portion 311A of the teeth 311 that are annularly disposed, from the inner peripheral surface side thereof, as shown in FIGS. 13 and 14. The cover portion 312C includes a groove portion 312G1 and a guide portion 312G2 for receiving both ends 313E, 313E of the coil 313 (see FIG. 15).

As shown in FIG. 3, the groove portion 312G1 is provided on the one end side in the width direction (Y-axis direction) at one end of the cover portion 312C in the height direction (Z-axis direction), and formed along the Z-axis direction to have a depth reaching a position close to the base portion 312B. The groove portion 312G1 is formed so as to penetrate the cover portion 312C in the X-axis direction with a width of approximately the outer diameter (or wire diameter) of the coil 313. The groove portion 312G1 is for receiving the one end 313E of the coil 313 and for guiding the direction of one end of coil along the X-axis.

As shown in FIG. 3 and FIG. 4, the guide portion 312G2 is provided along the Z-axis direction from the other end side in the width direction at one end of the cover portion 312C in the height direction to the other end of the cover portion 312C in the height direction. The guide portion 312G2 is provided on the inner peripheral surface side of the cover portion 312C and is formed as a linear groove having a width and depth similar to the outer diameter of the coil 313. The guide portion 312G2 is for receiving the one end 313E of the coil 313 and guiding it so that the direction in which the one end of the coil faces is along the Z-axis.

Further, a female claw portion 312P for assembling the bus bar unit 40 or the casing 10 is formed between the groove portion 312G1 and the guide portion 312G2 at one end of the cover portion 312C in the height direction.

Figure 15:
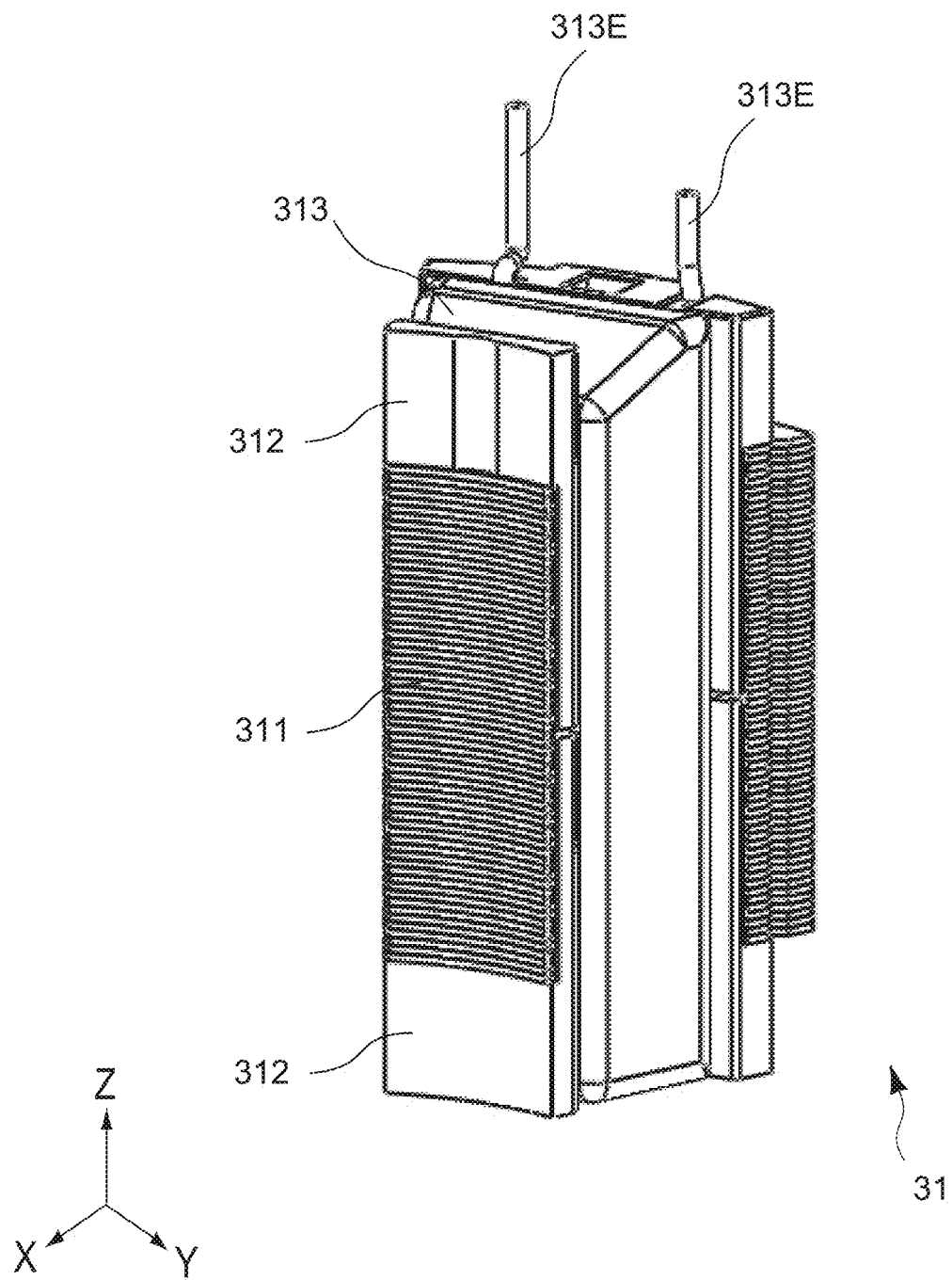
FIG. 15 is a perspective view showing a state in which a coil is wound after the state shown in FIG. 14.

Note that it does not necessarily need to provide the groove portion 312G1 and the guide portion 312G2 in one insulator 312 on the lower side in the Z-axis direction shown in FIGS. 13 to 15.

A stopper portion 312R capable of being in contact with the end of the peripheral wall portion 311A when being mounted on the teeth 311 is provided in one end of the outer peripheral surface of the cover portion 312C in the height direction. The stopper portion 312R is for defining the mounting position of the insulator 312 with respect to the teeth 311 in the Z-axis direction (insertion depth of the projecting portion 311B with respect to the insulator 312) (see FIG. 14). The stopper portion 312R is located at the end of the thickened portion that partially thickens the cover portion 312C and is in contact with the teeth portion 311 prior to the base portion 312B upon attachment to the teeth portion 311.

The flange portion 312F is formed to rise in the inner diameter end of the base portion 312B. The flange portion 312F is for inhibiting the coil 313 from being unwound toward the inner periphery side (see FIG. 15).

A helical or multi-row winding-receiving recessed portion for aligning the stack winding of a series of coils 313 in the radial direction (X-axis direction) is formed on each of the outer surfaces of the base portion 312B and the pair of side surface portions 312S, 312S.

The cover portion 312C includes a notch 312C1 (see FIG. 4) that exposes, in the radial direction, the space defined by the base portion 312B and the pair of side surface portions 312S, 312S. The above-mentioned space and the notch 312C1 constitute an opening portion 312V for housing (receiving) the projecting portion 311B of the teeth 311 to be inserted in the Z-axis direction.

[Pair of Side Surface Portions of Insulator]

The pair of side surface portions 312S, 312S of the insulator 312 are in contact with the two side surfaces 311S, 311S (in the Z-axis direction) of the projecting portion 311B when being inserted into the teeth 311. In this embodiment, as shown in FIG. 5, the pair of side surface portions 312S, 312S of the insulator 312 are each inclined at a predetermined angle $\theta_1$ in the same direction with respect to the Z-axis direction before being inserted into the teeth 311. In this case, both ends in the Y-axis direction of the support area of the side surface portion 312S in the cover portion 312C are also inclined at the inclined angle $\theta_1$ in the Z-axis direction.

In addition, considering the ease of sliding, an insulator width 312W, which is the distance between inner surfaces of opening ends of the pair of side surface portions 312S, 312S, is slightly larger than a teeth width 311W (see FIG. 13), which is the distance between the two side surfaces 311S, 311S of the teeth 311 with which the insulator is in contact when being inserted.

The inclined angle $\theta_1$ generates an elastic return force for returning to a pre-deformation posture (hereinafter, referred to also as an initial posture) in the pair of side surface portions 312S, 312S that elastically deform so as to be parallel to the Z-axis direction when the insulator 312 is inserted into the teeth 311. This elastic return force acts as a biasing force against the two side surfaces 311S, 311S of the teeth 311 (projecting portion 311B) in the twisting direction with respect to the Z-axis direction (orientation about the X-axis in this example). This makes it possible to inhibit the insulator 312 from falling off the teeth 311 after being assembled to the teeth 311.

Further, in this embodiment, the pair of side surface portions 312S, 312S of the insulator 312 are each inclined at a predetermined angle $\theta_2$ in the same direction with respect to the X-axis direction before being inserted into the teeth 311, as shown in FIG. 6. In this case, both ends of the base portion 312B in the Y-axis direction are also inclined at the inclined angle $\theta_2$ in the X-axis direction.

The inclined angle $\theta_2$ generates an elastic return force for returning to the initial posture in the pair of side surface portions 312S, 312S that elastically deform so as to be parallel to the Z-axis direction when the insulator 312 is inserted into the teeth 311. This elastic return force acts as a biasing force against the two side surfaces 311S, 311S of the teeth 311 (projecting portion 311B) in the twisting direction with respect to the Z-axis direction (orientation about the Z-axis in this example). This makes it possible to inhibit the insulator 312 from falling off the teeth 311 after being assembled to the teeth 311.

The inclined angles $\theta_1$ and $\theta_2$ can be set independently, but it is desirable to set them in combination with each other in order to more reliably prevent inhibit the insulator 312 from falling off. Hereinafter, the pair of side surface portions 312S, 312S inclined at the inclined angle(s) $\theta_1$ and/or $\theta_2$ will be referred to also as the twisted part of the insulator 312.

The size of the predetermined inclined angles $\theta_1$ and $\theta_2$ is not particularly limited, and is set to, for example, ±1.0 to 10 degrees. This makes it possible to achieve the desired fall-off prevention effects of the insulator 312 while ensuring the assembling workability of the insulator 312 to the teeth 311. The pair of side surface portions 312S, 312S are substantially parallel to each other, and may be set at angles that differ by approximately ±1.0 to 10 degrees in consideration of the manufacturing tolerances.

Next, the above-mentioned twisted part of the insulator 312 will be described in terms of dimensions.

Figure 7A:
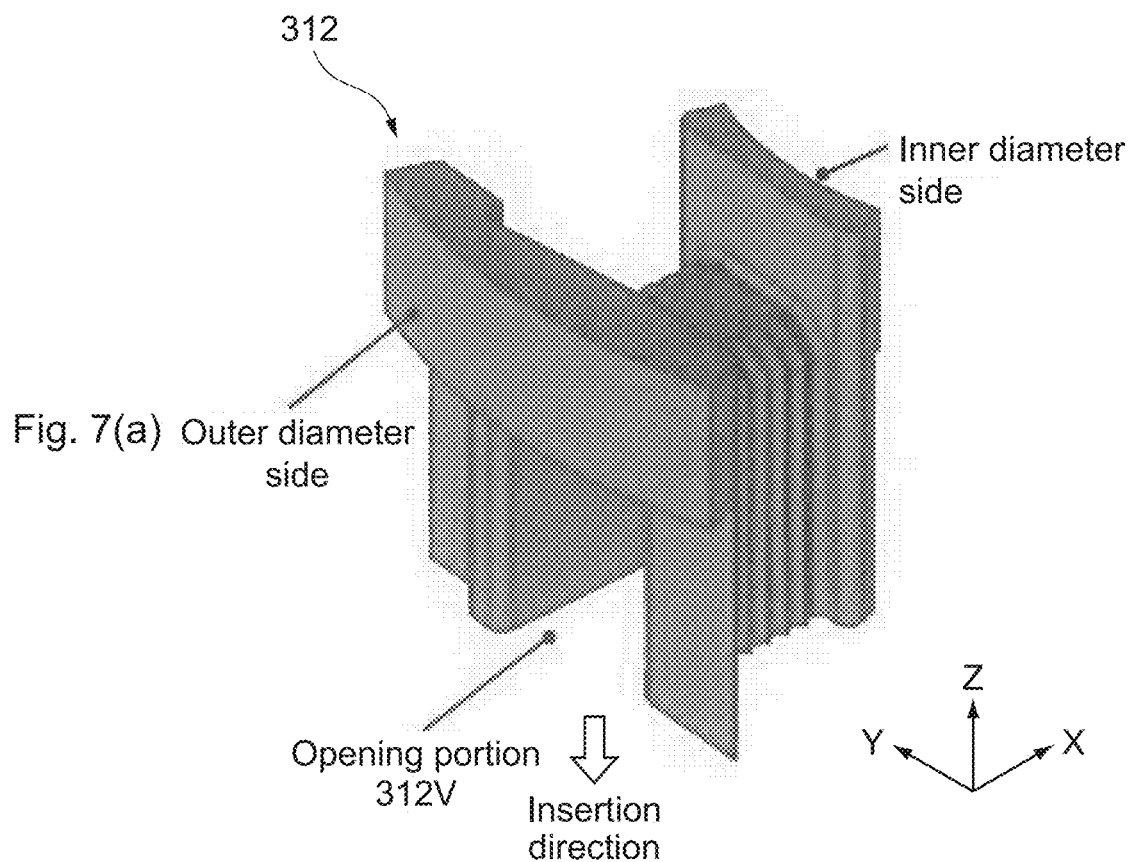
FIG. 7(a) is a perspective view of the insulator as viewed from the positive X-axis direction of FIG. 3, and of FIG. 7(b) is a perspective view showing an elastically deformed opening portion of the insulator after being inserted into teeth.

FIG. 7(a) is a perspective view of the insulator 312 shown in FIG. 3 as viewed from the outer diameter side.

Figure 7B:
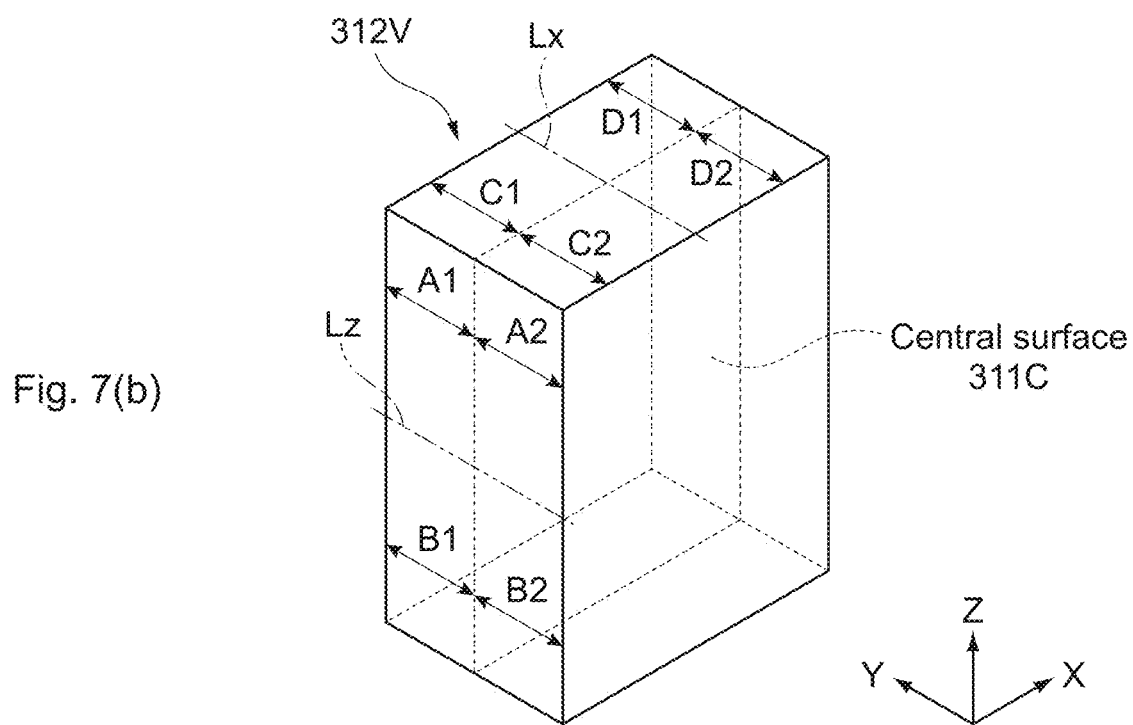

FIG. 7(b) is a perspective view schematically showing the outer shape of the elastically deformed opening portion 312V (see FIG. 3) of the insulator 312 after being inserted into the teeth 311. Here, the opening portion 312V is expressed in the same manner as the rectangular parallelepiped shape formed by the two parallel side surfaces 311S, 311S, the upper surface 311T, and the lower surface 311B of the teeth 311 (projecting portion 311B) to be in contact with (corresponding to) the opening portion 312V.

Then, as shown in of FIG. 7(b), the widths of both ends of the opening portion 312V in the Z-axis direction are denoted by A (=A1+A2) and B (=B1+B2). Then, the widths of both ends of the opening portion 312V in the X-axis direction are denoted by C (=C1+C2) and D (=D1+D2).

Here, the widths of both ends of the opening portion 312V in the Z-axis direction mean the width dimension along the Y-axis direction of each of two positions symmetrical with respect to a center line Lz that bisects the opening portion 312V in the Z-axis direction. Typically, the widths of both ends of the opening portion 312V in the Z-axis direction refer to the widths near both ends of the opening portion 312V in the Z-axis direction.

Similarly, the widths of both ends of the opening portion 312V in the X-axis direction mean the width dimension along the Y-axis direction of each of two positions symmetrical with respect to the center line Lx that bisects the opening portion 312V in the X-axis direction. Typically, the widths of both ends of the opening portion 312V in the X-axis direction refer to the widths near both ends of the opening portion 312V in the X-axis direction.

As a basic shape of the twisted part of the insulator 312, the pair of side surface portions 312S, 312S can be formed so that the following inequality is satisfied.

Teeth width w<A<B (tapered shape in which the tip of the opening portion 312V in the Z-axis direction is wider) or Teeth width w<B<A (tapered shape in which the depth of the opening portion 312V in the Z-axis direction is wider), the "teeth width w" being the teeth width 311W (see FIG. 13).

In other words, this twisted part can be formed so that the teeth width w<A≠B. Here, in the case where B>A, the mold releasability from the molding die is improved.

Lengths A, B, C, and D corresponding to widths of the respective portions of the opening portion 312V are divided into two in the Y-axis direction by projecting a central surface 311C parallel to the X-Z plane passing through the center between the two parallel side surfaces 311S, 311S of the teeth 311 onto the insulator 312 (the opening portion 312V) while the insulator 312 is caused to face the teeth 311 for insertion as shown in FIG. 13. As shown in Part (b) of FIG. 7(b), the obtained lengths are denoted by A1, A2, B1, B2, C1, C2, D1, and D2. That is, A=A1+A2, B=B1+B2, C=C1+C2, and D=D1+D2.

FIGS. 8 to 12 are each a perspective view showing one shape of the pair of side surface portions 312S, 312S (the opening portion 312V) of the insulator 312 in the natural condition before being attached to the teeth 311.

Figure 8:
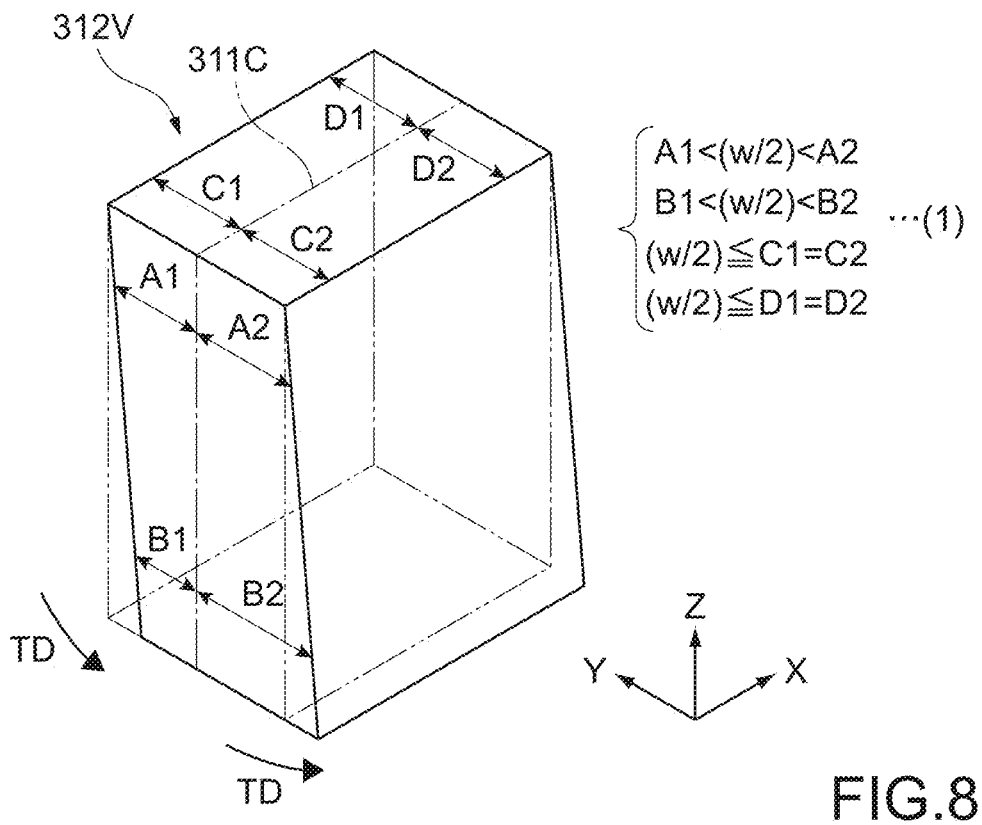
FIG. 8 is a perspective view showing one shape of a pair of side surface portions of the insulator.

On the basis of the inequalities of the basic shape of the twisted part of the insulator 312 described above, the dimensions of the pair of side surface portions 312S, 312S are determined (i.e., formed) such that the following inequalities (1) as shown in FIG. 8 are satisfied.

$A1$<teeth width $w/2$<$A2$, $B1$<teeth width $w/2$<$B2$,

Teeth width $w/2$<$C1$=$C2$, and

Teeth width $w/2$<$D1$=$D2$ (1)

In this case, a twisting direction TD is about the X-axis.

Figure 9:
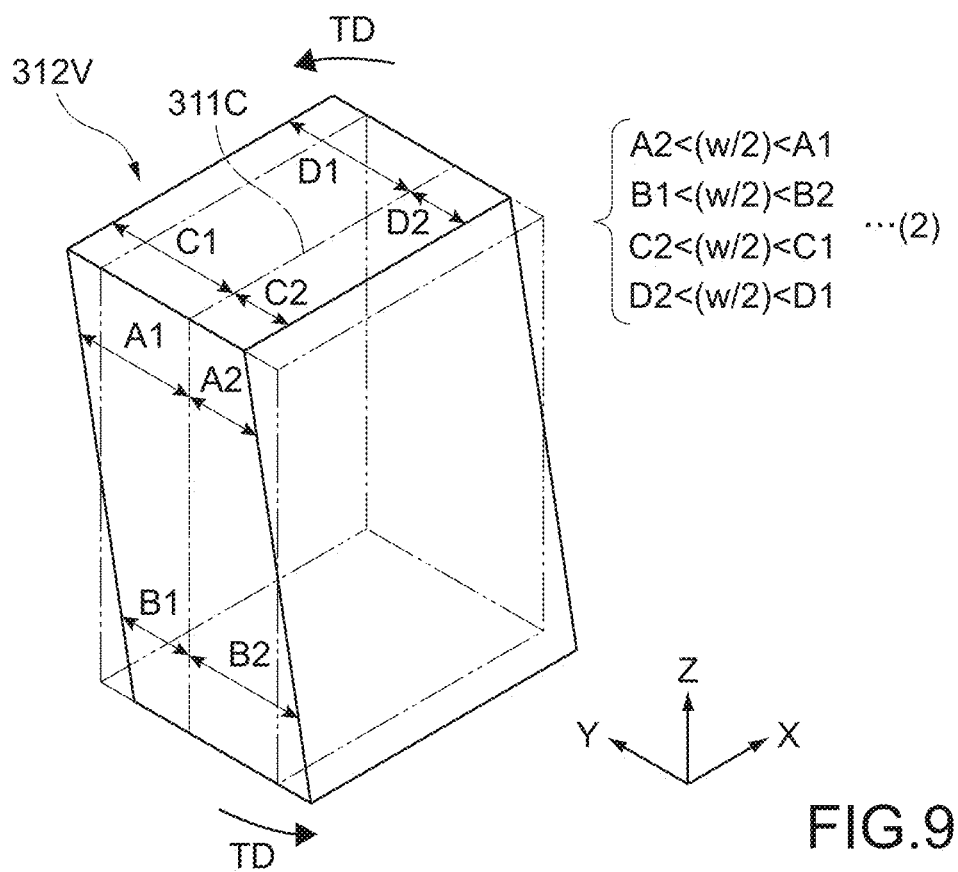
FIG. 9 is a perspective view showing one shape of the pair of side surface portions of the insulator.

Alternatively, as in FIG. 8, the dimensions of the pair of side surface portions 312S, 312S may be determined (formed) such that the following inequalities (2) as shown in FIG. 9 are satisfied.

$A2$<teeth width $w/2$<$A1$, $B1$<teeth width $w/2$<$B2$, $C2$<teeth width $w/2$<$C1$, and $D2$<teeth width $w/2$<$D1$ (2)

Also in this case, the twisting direction TD is about the X-axis.

Figure 10:
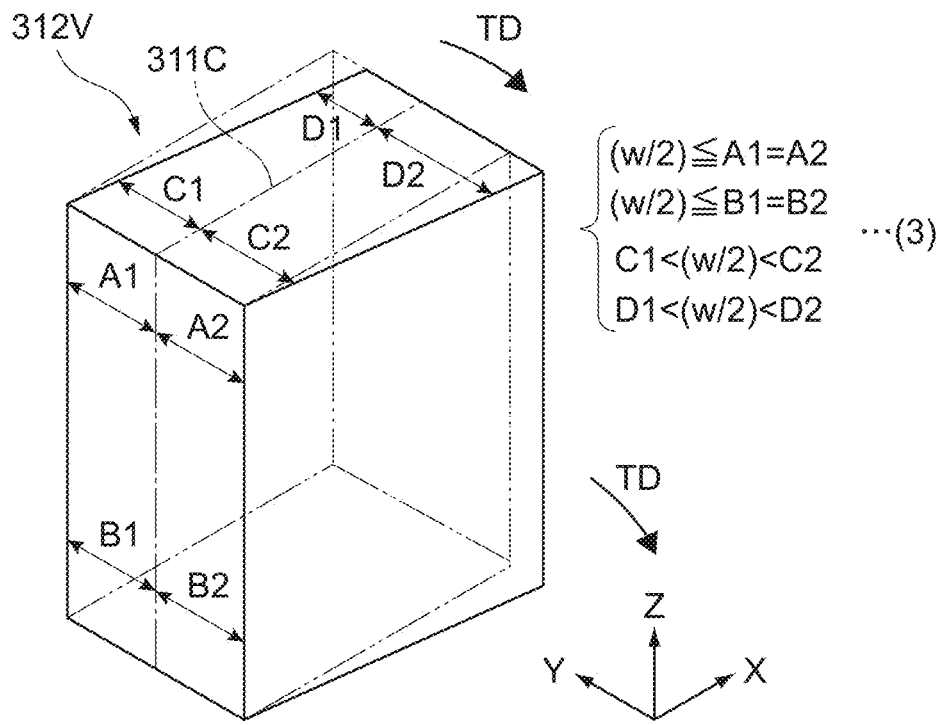
FIG. 10 is a perspective view showing one shape of the pair of side surface portions of the insulator.

Alternatively, the dimensions of the pair of side surface portions 312S, 312S may be determined (formed) such that the following inequalities (3) as shown in FIG. 10 are satisfied.

Teeth width $w/2$<$A1$=$A2$,

Teeth width $w/2$<$B1$=$B2$, $C1$<teeth width $w/2$<$C2$, and $D1$<teeth width $w/2$<$D2$ (3)

In this case, the twisting direction TD is about the Z-axis.

Figure 11:
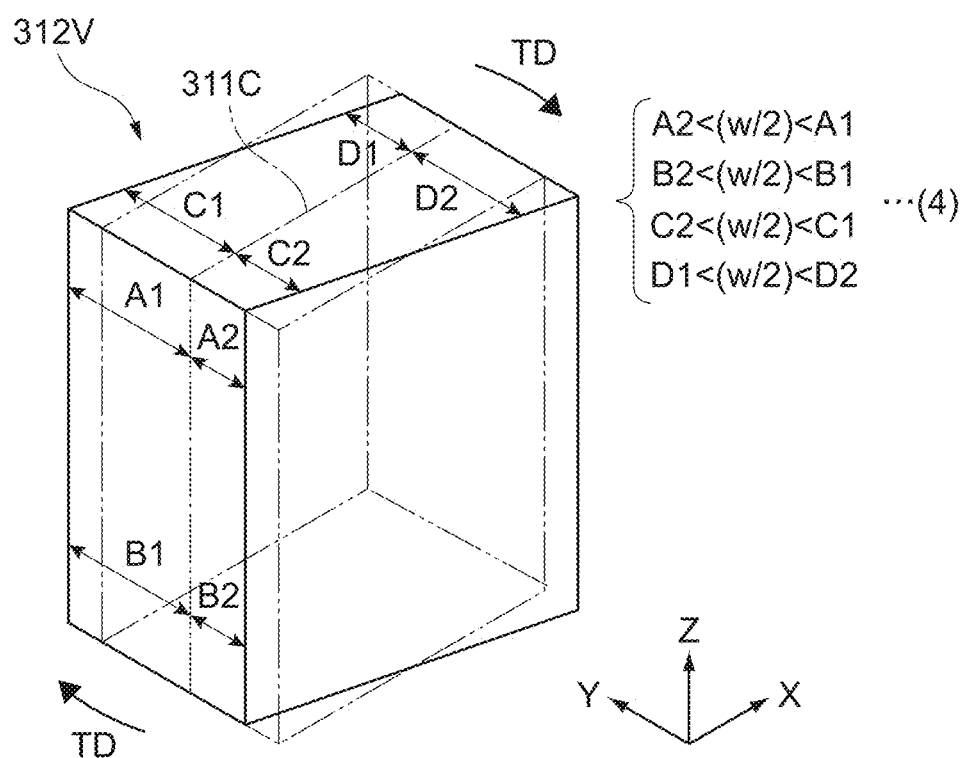
FIG. 11 is a perspective view showing one shape of the pair of side surface portions of the insulator.

Alternatively, the dimensions of the pair of side surface portions 312S, 312S may be determined (formed) such that the following inequalities (4) as shown in FIG. 11 are satisfied.

$A2$<teeth width $w/2$<$A1$, $B2$<teeth width $w/2$<$B1$, $C2$<teeth width $w/2$<$C1$, and $D1$<teeth width $w/2$<$D2$ (4)

Also in this case, the twisting direction TD is about the Z-axis.

Figure 12:
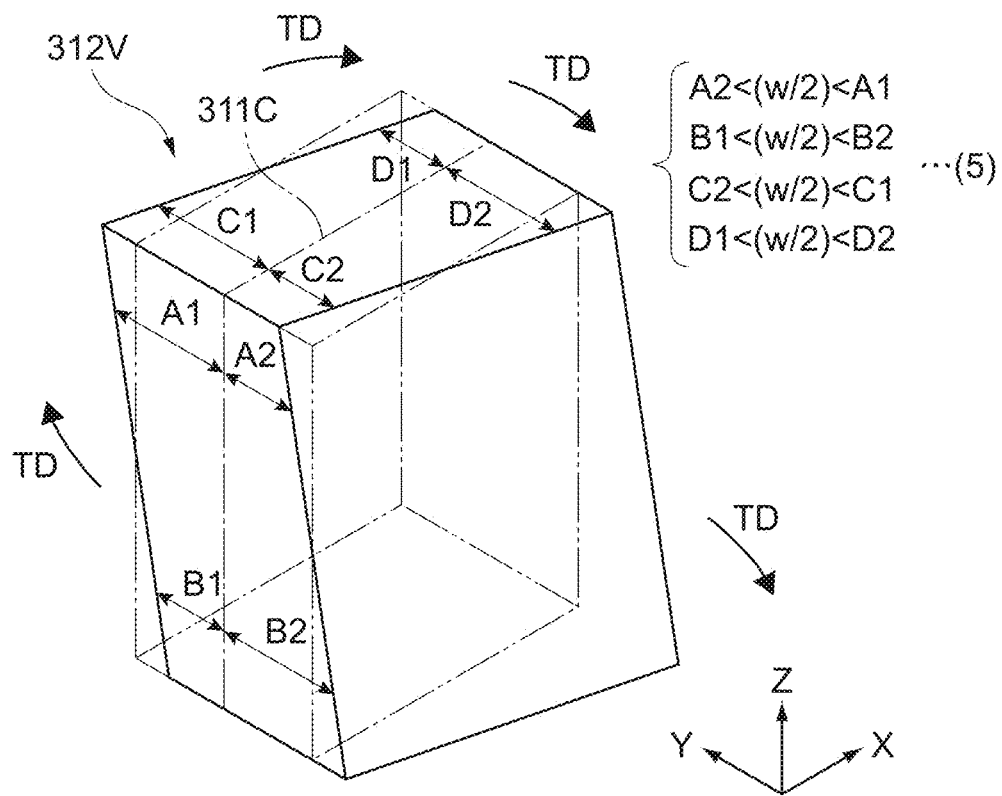
FIG. 12 is a perspective view showing one shape of the pair of side surface portions of the insulator.

Alternatively, the dimensions of the pair of side surface portions 312S, 312S may be determined (formed) such that the following inequalities (5) as shown in FIG. 12 are satisfied.

$A2$<teeth width $w/2$<$A1$, $B1$<teeth width $w/2$<$B2$, $C2$<teeth width $w/2$<$C1$, and $D1$<teeth width $w/2$<$D2$ (5)

In this case, the twisting direction TD is in the mixing direction about the X-axis and about the Z-axis.

When the pair of side surface portions 312S, 312S of the insulator 312 are dimensionally formed as described above, torsional urging of the pair of side surface portions 312S, 312S to the teeth 311 occurs in the insulator 312, similarly to those formed at the above-mentioned inclined angle (θ). In other words, with the dimension biased on one side with twisting with respect to the central surface 311C, an inverse force that attempts to return to the original position is generated for the teeth 311 from the pair of side surface portions 312S, 312S. This makes it possible to prevent inhibit the insulator 312 from falling off the teeth 311 with a simpler structure.

As the minimum dimensional condition for preventing-inhibiting falling off, for example, the pair of side surface portions 312S, 312S may be formed so as to satisfy at least one of the following relationships:

$A2$<teeth width $w/2$<$A1$;

$B1$<teeth width $w/2$<$B2$;

$C2$<teeth width $w/2$<$C1$; and $D1$<teeth width $w/2$<$D2$, or an arbitrary combination of two or more of them.

Further, the insulator width 312W is formed so as to be larger than the teeth width 311W (see FIG. 13) to be in contact therewith when being inserted at any height in the Z-axis direction. Therefore, the assemblability (ease of sliding) is also improved.

FIGS. 13 to 15 are each a perspective view showing the insulator pair according to an embodiment of the present invention.

FIG. 13 shows a state before the insulator pair 312, 312 is inserted into the teeth 311.

FIG. 14 shows a state in which the insulator pair 312, 312 is inserted into one tooth 311.

FIG. 15 shows a state in which the coil 313 is wound after the state shown in FIG. 14.

As shown in FIGS. 13 to 15, the insulator pair 312, 312 is slidably assembled (inserted) in the Z-axis direction from one end and the other end of the one tooth 311 in the Z-axis direction. At this time, the cover portion 312C and the tapered portions 312St of both the side surface portions 312S respectively engage with the inner diameter side of the peripheral wall portion 311A of the teeth 311 and the outer diameter side of the widening portion 311Bt of the tip of the projecting portion 311B and function to guide the assembly of the insulator to the teeth 311.

The pair of side surface portions 312S, 312S of the insulator 312 elastically deforms relative to the cover portion 312C that engages with the peripheral wall portion 311A of the teeth 311 so as to be parallel to the two parallel side surfaces 311S, 311S of the teeth 311. Then, a biasing force in the above-mentioned twisting direction is added from the pair of side surface portions 312S, 312S to the two side surfaces 311S, 311S.

With this biasing force, it is possible to inhibit the insulator 312 from falling off or dropping from the teeth 311 at the time of winding of the coil 313, attachment of the stator 31 to the bus bar unit 40 or the casing 10, or the like. After the assembly, the insulator pair 312, 312 may be in contact with each other in the Z-axis direction or may face each other with a predetermined gap therebetween.

Further, the insulator 312 is inserted along the twisting direction TD of itself. This insertion method allows the insulator 312 to be inserted into the teeth 311 more easily. Further, since the insulator width 312W is greater than the teeth width 311W at any point in the Z-axis direction, the insulator 312 can be more easily slid on (assembled to) the teeth 311.

<Modified Example>

While embodiments of the present invention have been described above, it is needless to say that the present invention is not limited to the above-mentioned embodiments only, and various modifications can be made. The insulator 312 hardly falls off the teeth 311 until winding of the coil 313 is completed, so that the workability of winding the coil is also improved.

Further, as an electronic apparatus, the rotating electric machine 100 used for an electric power steering apparatus of a vehicle has been described as an example in the above-mentioned embodiment, but it is also applicable to a rotating electric machine (motor) for other applications. Further, the electronic apparatus according to the present invention is applicable not only to a motor but also to other rotating electric machines such as a generator, and to other electronic apparatuses other than the rotating electric machine.

Further, the directions of the equal signs or unequal signs in the above-mentioned inequalities (1) to (5) indicating the relationship between the widths A to D of the opening portion 312V and the teeth width w may be such a twisted relationship that they are opposite to each other. Further, as in the embodiment, the side surface portion of the insulator and the teeth are not necessarily need to be linearly twisted and may be curvedly twisted. For example, the side surface portion of the insulator may be formed in an arc shape satisfying the torsional relationship described above.

Further, although the widths A to D of the opening portion 312V are set to the widths near both ends of the opening portion 312V in the Z-axis direction or X-axis direction, the present invention is not limited thereto and the widths of both ends of the opening portion 312V in the Z-axis direction or X-axis direction may be set (that is, A=C). In this case, B1 and B2 correspond to the width of the opening end of the opening portion 312V, A1 (=C1) and A2 (=C2) correspond to the width of the end on the insulator outer diameter side opposite to the opening end, and D1 and D2 correspond to the width of the end of the insulator inner diameter side opposite to the above-mentioned opening end (see FIGS. 7(a) and 7(b)).

The invention claimed is:

1. A rotating electric machine, comprising:
a rotor that rotates about a first axis;
a stator that includes teeth projecting toward the rotor;
insulators that are attached to the teeth; and
a coil that is wound around the insulators,
wherein each of the insulators includes a pair of side surface portions that are mounted on the teeth to generate a biasing force against the teeth in a twisting direction with respect to a direction of the first axis,
wherein each of the teeth includes a peripheral wall portion and a projecting portion, the peripheral wall portion constituting an outer peripheral surface of the stator, the projecting portion projecting from the peripheral wall portion toward the rotor,
wherein each of the insulators includes an opening portion housing the projecting portion,
wherein the pair of side surface portions are disposed to face each other in a direction of a second axis perpendicular to the first axis with the opening portion therebetween,
wherein the pair of side surface portions are formed so that at least one of the following relationships:

$A2 <$ teeth width $w/2 < A1$, and $B1 <$ teeth width $w/2 < B2$; or $C2 <$ teeth width $w/2 < C1$, and $D1 <$ teeth width $w/2 < D2$, is satisfied, the teeth width w being a width of each of the teeth corresponding to a distance between two parallel side surfaces of the teeth that are in contact with the pair of side surface portions of the corresponding insulator,
A and B being widths of both end portions of the opening portion before being assembled to the teeth in the direction of the first axis,
C and D being widths of the both end portions of the opening portion before being assembled to the teeth in a direction of a third axis perpendicular to the first axis and the second axis, and
A1, A2, B1, B2, C1, C2, D1, and D2 being respectively obtained by dividing A, B, C, and D into two by projecting a central surface between the two parallel side surfaces of the teeth on the opening portion while causing the insulators to face the teeth for insertion.

2. The rotating electric machine according to claim 1, wherein the pair of side surface portions generate the biasing force about the first axis against the projecting portion.

3. The rotating electric machine according to claim 1, wherein the pair of side surface portions generate the biasing force about the third axis and the second axis against the projecting portion.

4. The rotating electric machine according to claim 1, wherein each of the insulators further includes a cover portion that engages with the peripheral wall portion and supports the pair of side surface portions, and
wherein the pair of side surface portions are configured to be elastically deformable relative to the cover portion.

5. An insulator to be inserted into a tooth of a stator core of a motor that includes a rotor rotating about one axis, the insulator comprising:
a pair of side surface portions that generate a biasing force against the tooth in a twisting direction with respect to a direction of the one axis, wherein the tooth includes a peripheral wall portion and a projecting portion, the peripheral wall portion constituting an outer peripheral surface of the stator, the projecting portion projecting from the peripheral wall portion toward the rotor, wherein the insulator includes an opening portion housing the projecting portion, wherein the pair of side surface portions are disposed to face each other in a direction of a second axis perpendicular to the first axis with the opening portion therebetween, wherein the pair of side surface portions are formed so that at least one of the following relationships:

$A2 <$ tooth width $w/2 < A1$, and $B1 <$ tooth width $w/2 < B2$; or $C2 <$ tooth width $w/2 < C1$, and $D1 <$ tooth width $w/2 < D2$, is satisfied, the tooth width w being a width of the tooth corresponding to a distance between two parallel side surfaces of the tooth that are in contact with the pair of side surface portions of the insulator, A and B being widths of both end portions of the opening portion before being assembled to the tooth in the direction of the first axis, C and D being widths of the both end portions of the opening portion before being assembled to the tooth in a direction of a third axis perpendicular to the first axis and the second axis, and A1, A2, B1, B2, C1, C2, D1, and D2 being respectively obtained by dividing A, B, C, and D into two by projecting a central surface between the two parallel side surfaces of the tooth on the opening portion while causing the insulator to face the tooth for insertion.

6. A method of assembling insulators to teeth of a stator core of a motor that includes a rotor rotating about one axis, comprising:

preparing the insulators, each insulator including a pair of side surface portions that generate a biasing force against a respective tooth in a twisting direction with respect to a direction of the one axis; and inserting the insulators into the respective teeth along the twisting direction, wherein each of the teeth includes a peripheral wall portion and a projecting portion, the peripheral wall portion constituting an outer peripheral surface of the stator, the projecting portion projecting from the peripheral wall portion toward the rotor, wherein each of the insulators includes an opening portion housing the projecting portion, wherein the pair of side surface portions are disposed to face each other in a direction of a second axis perpendicular to the first axis with the opening portion therebetween, wherein the pair of side surface portions are formed so that at least one of the following relationships:

$A2 <$ teeth width $w/2 < A1$, and $B1 <$ teeth width $w/2 < B2$; or $C2 <$ teeth width $w/2 < C1$, and $D1 <$ teeth width $w/2 < D2$, is satisfied, the teeth width w being a width of each of the teeth corresponding to a distance between two parallel side surfaces of each of the teeth that are in contact with the pair of side surface portions of the corresponding insulator, A and B being widths of both end portions of the opening portion before being assembled to the teeth in the direction of the first axis, C and D being widths of the both end portions of the opening portion before being assembled to the teeth in a direction of a third axis perpendicular to the first axis and the second axis, and A1, A2, B1, B2, C1, C2, D1, and D2 being respectively obtained by dividing A, B, C, and D into two by projecting a central surface between the two parallel side surfaces of the teeth on the opening portion while causing the insulators to face the teeth for insertion.

* * * * *